United States Patent [19]

Lyon

[11] Patent Number: 5,339,754
[45] Date of Patent: Aug. 23, 1994

[54] METHOD AND APPARATUS FOR PREVENTION OF PUFFING BY ROTARY KILN AND OTHER INCINERATORS AND COMBUSTION SYSTEMS

[75] Inventor: Richard K. Lyon, Pittstown, N.J.

[73] Assignee: Energy and Environmental Research, Irvine, Calif.

[21] Appl. No.: 990,880

[22] Filed: Dec. 11, 1992

[51] Int. Cl.$^5$ ............................................. F23J 15/00
[52] U.S. Cl. ................................... 110/345; 110/246; 422/180; 422/181; 423/213.2; 423/245.3
[58] Field of Search ............... 110/345, 342, 346, 246; 422/177, 179, 180, 181; 423/213.2, 245.3

[56] References Cited

U.S. PATENT DOCUMENTS

| | | | |
|---|---|---|---|
| 4,388,877 | 6/1983 | Molayem et al. | 110/345 X |
| 4,400,356 | 8/1983 | McVay et al. | 110/345 X |
| 5,130,100 | 7/1992 | Serizawa | 423/213.2 X |

OTHER PUBLICATIONS

Bhattacharyya, et al., Catalytic Sox Abatement of FCC Flue Gases, Preprints of Papers Presented at the 194th National Meeting of the American Chemical Society, vol. 32, No. 4, Aug. 31–Sep. 4, 1987.
J. O. L. Wendt, et al., *Prediction of Transient Behavior During Batch Incineration of Liquids Wastes in Rotary Kiln*, Hazardous Waste & Hazardous Materials, vol. 7, No. 1, 1990, Mary Ann Liebert, Inc., Publishers.
J. O. L. Wendt, et al., *Mechanisms Governing Transients from the Batch Incineration of Liquid Wastes in Rotary Kiln*, Combustion Science and Technology, 1988, vol. 61, pp. 169–185.
P. M. Lemieux, et al. *Minimization of Transient Emissions From Rotary Kiln Incinerators*, Prepared for Submission to Combustion Science and Technology, Aug. 2, 1989 (Revised Jan. 5, 1990).
C. C. Shale, *Ammonia Injection: A Route to Clean Stacks*, Advances in Chemistry Series 127, American Chemical Society, Washington, D.C., (1973).

*Primary Examiner*—Edward G. Favors
*Attorney, Agent, or Firm*—Workman, Nydegger & Jensen

[57] ABSTRACT

A method and apparatus are provided for oxidizing unoxidized fuel in combustion systems in which the air and fuel are not completely and uniformly mixed, the average air fuel ratio being sufficient for complete oxidation, but portions not containing sufficient air for complete oxidation. A bed of a readily reducible metal oxide, the reduced form of this metal oxide being readily oxidized, is placed within the combustion system. The air and fuel are passed through the bed at an elevated temperature, the metal oxide oxidizing those portions not containing sufficient air for complete combustion, and then being reoxidized by those portions which contain more than sufficient air for complete combustion.

41 Claims, 12 Drawing Sheets

METHOD AND APPARATUS FOR PREVENTION OF PUFFING BY ROTARY KILN AND OTHER INCINERATORS AND COMBUSTION SYSTEMS

BACKGROUND

1. Field of the Invention

The present invention is directed to apparatus and methods for oxidizing fuel in combustion systems. More particularly, in one embodiment the present invention is directed to methods and apparatus for oxidizing fuel in order to control puffing by incinerators of generally high toxic unoxidized and partially oxidized organic vapors to the environment. In another embodiment the present invention is directed toward the combustion of fuel with very low emissions of $NO_x$.

2. Background Art

The United States currently produces 265 million tons per year of hazardous waste. In most instances the toxicity of this waste comes from toxic organic materials which, in principle, can be completely destroyed by incineration. In contrast to incineration, all other disposal technologies involve the risk that some of the toxic materials will return to the environment. Thus, incineration, in principle, is the ideal solution to the problem of waste disposal.

Available incinerator technology, however, is subject to a number of limitations. One of the most important of these limitations is the occasional emission of puffs of toxic organic materials into the environment by rotary kiln incinerators. This problem, referred to as "puffing," is serious within the incineration field, since rotary kiln incinerators are a substantial fraction of total U.S. incineration capacity.

The severity of an incinerator's puffing problems depends upon a number of parameters: the rate of radiative heat transfer, the rate at which fresh surface is exposed, the frequency at which slugs of material capable of forming puffs are added to the incinerator, and the size of those slugs. The latter two parameters are directly controllable while the former two are partially controllable by changing operating parameters such as the rate of rotation. Thus, while it is possible for an incinerator to manage puffing problems, this means operating the incinerator at a capacity that is less than the capacity it would have if puffing were not an issue.

Rotary kiln incinerators handle both solid and liquid wastes. For combustible liquid wastes the practice is to mix the liquid waste with a sorbent, which is then placed in a container (typically a cardboard, plastic, or steel drum), and fed to the rotary kiln incinerator. These large closed containers are heated until the vapor pressure of the liquid is sufficient to cause them to rupture. This results in a sudden discharge of a large amount of combustible vapors into the incinerator.

Often, when this sudden discharge occurs, the supply of combustion air within the incinerator can be much less than sufficient for complete oxidation of these suddenly released vapors. This can cause substantial amounts of these toxic organic vapors to be discharged from the incinerator into the environment without first being oxidized.

A problem very similar to puffing is likely to occur during the U.S. Army's planned disposal of its chemical weapons.

Generally, the Army's plan of disposal of nerve agent mines and other chemical agent munitions consisted of bringing munitions into a negative pressure building and unpacked, the packing material going to a dunnage incinerator. Some of these munitions (i.e., the bombs and ton containers) do not contain energetic materials. The nerve agents are drained from these munitions and sent to a liquid incinerator, and the empty munitions go to another incinerator, the metal parts furnace. Other munitions, such as rockets, mines and shells, do contain energetic materials. These energetic materials are decades old and in some instances their stability is questionable. Nevertheless, these old explosives must be handled, taken out of the rocket, mine, or projectile, and sent to another incinerator, the "deactivation furnace system." Following this, rockets, mines and projectiles are drained of their chemical agent, with the agent again going to the liquid incinerator and the empty munitions going to the metal parts furnace.

The incineration systems the U.S. Army presently plan to build involves unpacking these overage munitions, removing whatever explosive materials they contain, and draining them of nerve agent. The safety problems involved in doing this much handling are large and expensive to solve. Consequently, the disposal of these munitions is expected to cost billions.

GA Technologies has done an analysis of the risks involved in the disposal of these weapons. In this analysis, the greatest risk in disposing of the weapons, was found to be the accidental feeding of a mine or other munition, which had not been emptied of its nerve agent into the packing material incinerator. The nerve agent contained within the mine would suddenly be vaporized within the incinerator, thereby causing a nearly instantaneous release of combustible organic vapor into the incinerator. The supply of combustion air would not be nearly adequate for complete combustion of this nerve agent, and so the nerve agent would be released in an unoxidized state. Up to 15 pounds of nerve agent could be released to the atmosphere in a puff.

GA Technologies estimate the probability for this accident at 0.01 per year per site, and the U.S. Army's present plans call for building nine facilities of this general design. The Army regards the risk of discharging 15 pounds of nerve gas to the environment as marginally acceptable since the probability of the event is not high and the amount of nerve gas released small enough that casualties in the downwind civilian population are unlikely. However, since there are nine sites planned, and the destruction of the munitions will require a number of years, the probability of such an accident happening at least once is significant.

Generally, incinerators are evaluated in terms of the fraction of the input organic which they destroy, i.e., the DRE or the destruction and removal effectiveness. Despite their tendency to occasionally puff, most rotary kiln incinerators achieve a sufficiently high DRE on average so that their operations are at least marginally acceptable from an environmental viewpoint.

Regulations regarding the operation of incinerators are written in terms of the destruction and removal efficiency (the DRE), and typically their requirement for the DRE average is 99.99%. In cases of incinerators which handle extremely toxic materials, a DRE of 99.9999% is sometimes required. This requirement, however, relates to the DRE measured as a rolling average over a period of time. Thus, a technology which eliminates puffs need not itself be 99.99% effective in order to be satisfactory. It is sufficient that the incinerator using this technology have a DRE of 99.99% or 99.9999% on a time average basis. Hence, in most situations in which puffing is a problem, a technology which decreases the size of the puff being emitted to the atmosphere by a factor of 10 to 100 would be satisfactory.

However, the technology will be useful only if it has sufficient capacity. For the sake of a numerical example, a puff control device with a residence time of 0.5 seconds at a temperature of 800° C. should be considered, this device treating a puff of toluene having a median height of 5,000 ppm and a duration of 34 seconds. Oxidizing one mole of toluene requires 11 moles of oxygen or 55 moles of air. Consequently to completely oxidize the puff in this example the device would need a capacity equivalent to 18.7 cc of air per cc of the devices' volume.

As another example, 15 pounds of the nerve gas GB ($C_4H_{10}FO_2P$) is suddenly introduced to a 5 megawatt incinerator using combustion air at 4.66 pounds per second. This corresponds to 0.16 pound moles of air per second and 0.107 pound moles of GB. Oxidation of 0.107 pound moles of GB will require 3.48 pound moles of air. Since the gas passing through the puffing control device has a residence time of 0.5 seconds, the device has a volume sufficient to hold 0.08 pound moles of air. Thus, to completely oxidize the nerve gas the device would need a capacity equivalent to 3.48/0.08 or 43.5 cc of air per cc of the device's volume.

OBJECTS AND BRIEF DESCRIPTION OF THE INVENTION

A principle object of the present invention is to provide a method and apparatus for completely oxidizing fuel in combustion systems.

Another object of the invention is to provide a method and apparatus for oxidizing fuel in combustion systems whereby obsolete chemical munitions can be disposed of by the United States Army without the high risk of discharging the nerve agent to the environment.

Still another object of the present invention is to provide method and apparatus for oxidizing fuel in combustion systems wherein the amount of materials such as highly refractory materials which can escape incineration is reduced.

Yet another object of the present invention is to provide a method and apparatus for preventing puffing by rotary kiln incinerators and other similar incinerators.

A further object of the present invention is to provide a novel combustion system wherein $NO_x$ production is suppressed.

An additional object of the present invention is to provide a novel combustion system wherein $CO_2$ emissions are controlled.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method and apparatus has been developed whereby puffing is controlled in combustion systems such that unoxidized slugs of organic matter are not released into the atmosphere. Rotary kiln incinerators or other similar incinerators will be discussed as examples of combustion systems within the scope of the present invention.

Generally, incinerators consume combustion air as fast as it is supplied. Therefore, when organic matter enters the combustion chamber in slugs rather than in small amounts, there is no extra combustion air with which to oxidize the sudden slugs of organic matter. When this occurs the organic matter is discharged into the environment unoxidized and usually highly toxic. The present invention provides a method that prevents this discharge into the environment of the unoxidized material by providing a supply of oxygen which can oxidize the unoxidized material.

Within the scope of the present invention, a method for oxidizing fuel is provided for combustion devices. In these combustion devices, the mixture of fuel and air can at times be either nonuniform in space, or fluctuating in time. (For example, in the incinerators when the organic material appears in slugs rather than in a steady stream.) To compensate for these nonuniformities, an oxidizing means for supplying a readily reducible metal oxide is provided within the combustion device in order to act as a reservoir of oxygen.

Once this oxidizing means for supplying a readily reducible metal oxide is provided, the nonuniform fuel and air mixture is passed therethrough at elevated temperatures. As the metal oxide is reduced, the unoxidized fuel is oxidized. Later, air reoxidizes the metal to metal oxide and the metal oxide can be used again.

The present invention provides, in effect, a reservoir of combustion air which can be utilized when the sudden bursts of unoxidized fuel arise. In the present invention, copper oxide supported on high surface area alumina is preferred as the metal oxide.

The copper oxide, or other readily reducible metal oxide, can be placed into the combustion systems in three forms. It can be positioned as a fixed bed of individual metal oxide particles, a fluid bed of individual metal oxide particles, or as a monolith honeycomb structure having channels formed therethrough for passage of the air and fuel mixtures.

The step of passing the fuel and air mixture, at elevated temperatures, through the oxidizing means may transpire either within the region of greatest heat release within the combustion device, or downstream of the region of the greatest heat release.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

A. Description of Present Invention

The present invention relates to methods for oxidizing fuel and organic material in combustion systems such as rotary kiln incinerators. Additionally, the present invention relates to formation of a novel combustion system wherein $NO_x$ production is controlled during combustion wherein the air and the fuel is not mixed. The present invention also relates to formation of a novel combustion system wherein $CO_2$ emission is controlled during combustion wherein the air and the fuel is not mixed.

In one embodiment, the present invention is directed to combustion devices wherein the fuel and air mixture is either nonuniform in space or fluctuates in time, such that at times, there is not a sufficient amount of combustion air to completely oxidize the fuel, and the unoxidized fuel is expelled into the atmosphere. Although all combustion systems may be within the scope of the present invention, for the sake of clarity and example, rotary kiln and other incinerators will be discussed.

The instant invention provides solutions to problems of puffing by rotary kilns and of nerve gas discharge by the Army's incinerators. Puffing is a result of the fact that organic matter sometimes goes into the combustion chamber in slugs and that a conventional incinerator does not maintain a inventory of combustion air with which to oxidize these slugs of organic matter.

Figure 12:
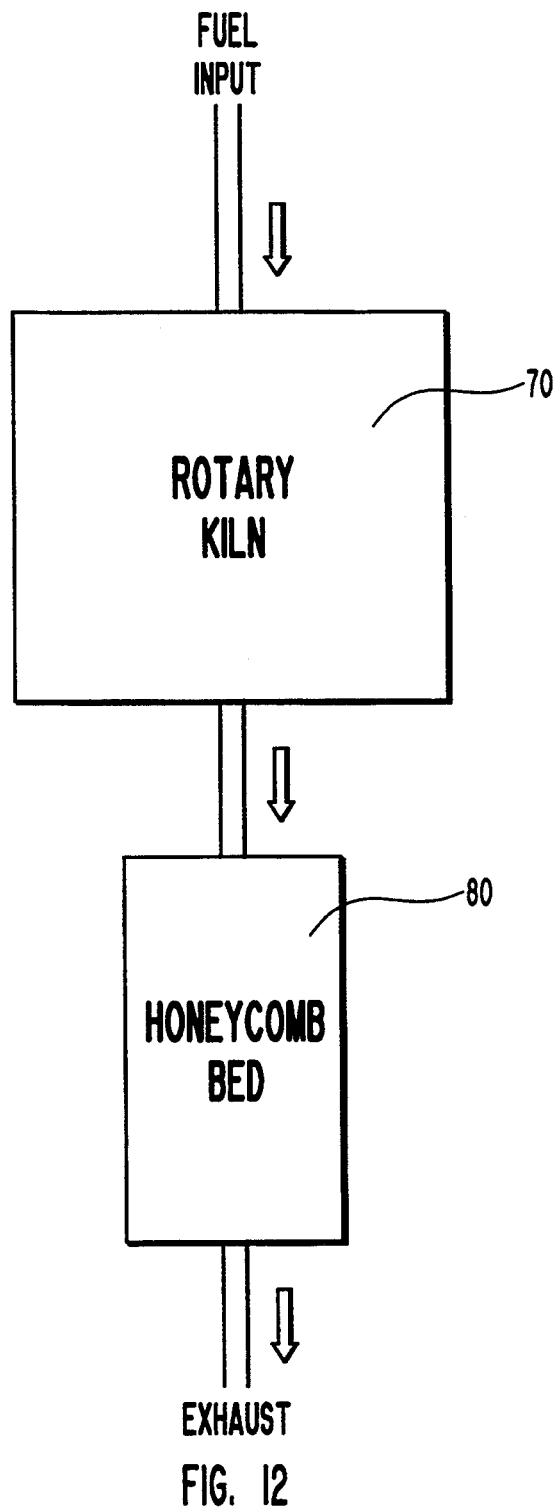
FIG. 12 is a schematic block diagram of a rotary kiln incinerator setup and a honeycomb bed of reducible metal oxide to oxidize organic compounds.

In the instant invention the rotary kiln 70 (FIG. 12), or Army incinerator is operated in conventional fashion except that an oxidizing means for supplying a readily reducible metal oxide is provided within the incinerator. The gases coming out of the kiln 70 are passed at elevated temperatures through this oxidizing means. As the gases pass therethrough, any unoxidized gases react with the readily reduced oxide of the oxidizing means such that the gasses are completely oxidized.

Within the method of the present invention, once the oxidizing means is placed within the combustion system, gases are flowed through the oxidizing means at elevated temperatures. These elevated temperatures are preferably greater than 600° C. The temperatures are even more preferably within the range of about 700° C. to about 1,200° C., and most preferably within the range of about 750° C. to about 1,050° C.

The residence time of the gas passing through the oxidizing means should be equal to or greater than 0.01 seconds. The residence time is more preferably equal to or greater than 0.1, and most preferably within the range of about 0.1 to about 2.0 seconds.

In the preferred embodiment, the reducible metal oxide comprises copper oxide, a well-known oxidation catalyst, and the high surface support comprises individual aluminum oxide particles. Organic matter passing through copper oxide at elevated temperatures is rapidly oxidized and the copper oxide is reduced to copper. The copper rapidly reoxidizes to copper oxide on exposure to air. Thus, the copper oxide can provide a reservoir of stored oxygen adequate to oxidize puffs of organic vapors which would otherwise escape. Another possible metal oxide which may be used is iron oxide.

It can be appreciated that the copper oxide particles could be placed within the combustion systems in three forms. First, the copper oxide particles supported on an aluminum oxide bed could be used in a static packed bed. They could also be used in a fluid bed. Alternatively, the high surface area aluminum oxide could be used as a monolith, that is, porous alumina may be fabricated into a shape resembling a honeycomb rather than a bed of individual metal oxide particles. This honeycomb shape is then impregnated with a reducible metal oxide. The honeycomb bed 80 (FIG. 12) has channels formed therethrough through which the air and fuel or other organic gases may pass.

In another embodiment, the present invention is a method of burning fuel with air with greatly reduced production of $NO_x$ compared to conventional combustion systems. Whereas in conventional combustion systems the fuel and air are mixed either before or during combustion, in this embodiment of the present invention, the fuel and air either are never mixed or are mixed only after they have passed the oxidizing means for supplying a readily reducible metal oxide.

While not wishing to be bound by any specific theory of why this "unmixed combustion" achieves very low $NO_x$ production, the experimental results given in the example below are not incompatible with the generally accepted mechanisms for $NO_x$ production.

For fuels which do not contain chemically bound nitrogen, it is generally agreed that $NO_x$ is chiefly thermal $NO_x$, i.e. most of the $NO_x$ is produced by the "extended" Zeldovitch mechanism, $O+N_2=NO+N$, $N+O_2=NO+O$, $OH+N=NO+H$. The other source of $NO_x$ is the prompt $NO_x$ mechanism, i.e. the attack of hydrocarbon radicals such as CH on $N_2$ to produce HCN which is then oxidized to NO. Both these mechanisms are strongly disfavored at lower temperatures and prompt $NO_x$ requires contact between the fuel and air. By eliminating direct contact between the fuel and air, unmixed combustion avoids $NO_x$ production via the prompt $NO_x$ mechanism. Since the extremely high temperatures normally associated with combustion are also avoided, the thermal $NO_x$ mechanism is also avoided.

In a third embodiment within the scope of the present invention, the present invention is a means of burning fuel with air while producing combustion gases from which the $CO_2$ is readily recovered, thereby reducing the undesirable emissions of $CO_2$ to the atmosphere. The problem of global warming due to the emissions of $CO_2$ during combustion has recently begun to receive a great deal of serious attention. This problem has lead to calls for improved thermal efficiency, increased energy conservation, and similar measures which would marginally decrease $CO_2$ emissions. There have, however, been few if any serious proposals for developing a technology that would solve the problem, i.e. a technology that would permit fossil fuel combustion without substantial $CO_2$ emissions.

Unmixed combustion, however, can be done with the CuO circulating between a pair of fluid beds. The gas coming out of one bed would, after condensation of water, be virtually pure $CO_2$. In many locations, pure $CO_2$ could economically be pumped down abandoned gas wells, used in tertiary oil recovery or put to other use. Previously these options have been given little consideration because recovering dilute $CO_2$ from combustion effluents is both expensive and consumes considerable amounts of energy. Since unmixed combustion can avoid the problem of $CO_2$ recovery, it provides a means of burning fuel without $CO_2$ emissions.

If preferred, instead of using a system in which CuO circulates between fluid beds, a single bed with a valve or other flow control device on its outlet may be used. When the gas coming out of the bed consists of $CO_2$ and water vapor, this flow control device would direct the gas to $CO_2$ recovery facilities. When the gas coming out of the bed consists of air whose oxygen content has been decreased, the flow control device would direct the gas to disposal.

B. EXAMPLES

The following examples illustrate use of a reducible metal oxide as a reservoir of oxygen within a combustion device. These examples are intended to be purely exemplary of the use of the invention and should not be viewed as limiting the scope of the present invention.

EXAMPLE 1

Figure 1:
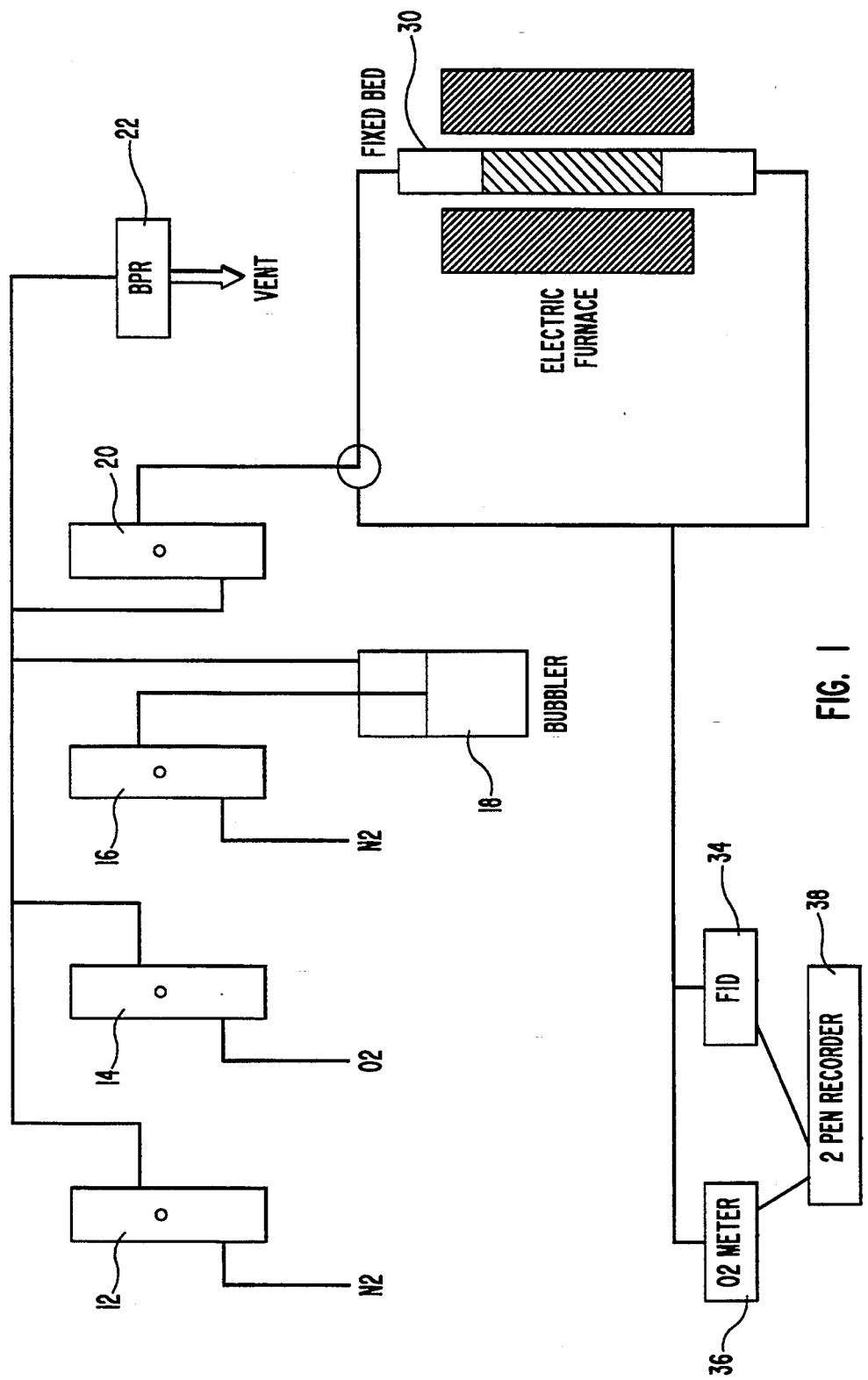
FIG. 1 illustrates an experimental setup using a fixed bed of reducible metal oxide to oxidize organic compounds.

The apparatus shown in FIG. 1 demonstrates, on a laboratory scale, the fixed bed embodiment within the scope of the present invention. In this experimental arrangement, rotameters 12 and 14, were used to prepare a flowing gas mixture containing oxygen and nitrogen in known proportions. For experiments involving volatile organic compounds a third rotameter 16 was used to send a measured flow of nitrogen through a bubbler 18 partially filled with the volatile organic compound. This stream of nitrogen saturated with the volatile organic was added to the flow of the oxygen/nitrogen mixture. A fourth rotameter 20 was then used to take a measured portion of this flowing mixture while the rest of the mixture was sent to vent via a back pressure regulator 22. For experiments with materials which are not readily volatile, i.e., phosphonoacetic acid, a precision metering pump was used to send a flow of an aqueous solution of the material to the top of a fixed bed 30 of copper oxide where the temperature was high enough to cause the material to vaporize.

From the fourth rotameter 20, the flowing gas mixture was sent to a three-way valve 32 and thence either went downward through the fixed bed 30 and then to the analytical instruments or went directly to the analytical instruments, the analytical instruments being a flame ionization detector 34, and an oxygen meter 36, whose output was recorded by a two pen recorder 38.

In these experiments the fixed bed 30 was housed in a one-inch OD stainless steel tube inside an electrically heated furnace. Two type K thermocouples were used to monitor and control its temperature.

The analytical instruments used were a Beckmann 400 Hydrocarbon analyzer (i.e., a flame ionization detector) and a Teledyne O2 analyzer.

The fixed bed consisted of 25.5 wt % CuO supported on 5/16 inch alumina rings and was prepared by the incipient wetness method. In this method a solution of copper nitrate was added to the alumina with constant stirring until the bed could not absorb more without becoming macroscopically wet. The alumina rings were then heated to 800° C. to drive off water and decomposed copper nitrate to copper oxide. Manufacturer's specifications on these alumina rings list them to have a surface area of 284 $M^2$/gm, total pore volume $H_2O$, of 1.10 cc/gm, total pore volume, Hg, of 1,038 cc/gm, and a median pore diameter of 0.009 microns.

Table 1 lists the conditions used in these experiments.

The procedure used in the experiments is described below. Initially, an oxygen and nitrogen mixture without any organic matter therein was passed through the fixed bed 30. The oxygen level was measured for the gas exiting the fixed bed 30. Then, organic matter was added via either the bubbler 18 for volatile organic compounds, or the metering pump for the compounds not readily volatile. The oxygen level of the exit gas was again noted.

The flame ionization detector 34 was limited to concentrations less than 1,000 ppmC. The change in the oxygen content which occurred when organic matter was added was used to calculate the input concentration of the organic matter.

The oxygen content of the gas going into the fixed bed 30 was then reduced to zero, and the flame ionization detector 34 was used to measure the amount of organic matter which survived passage through the fixed bed 30 as a function of time.

Figure 2:
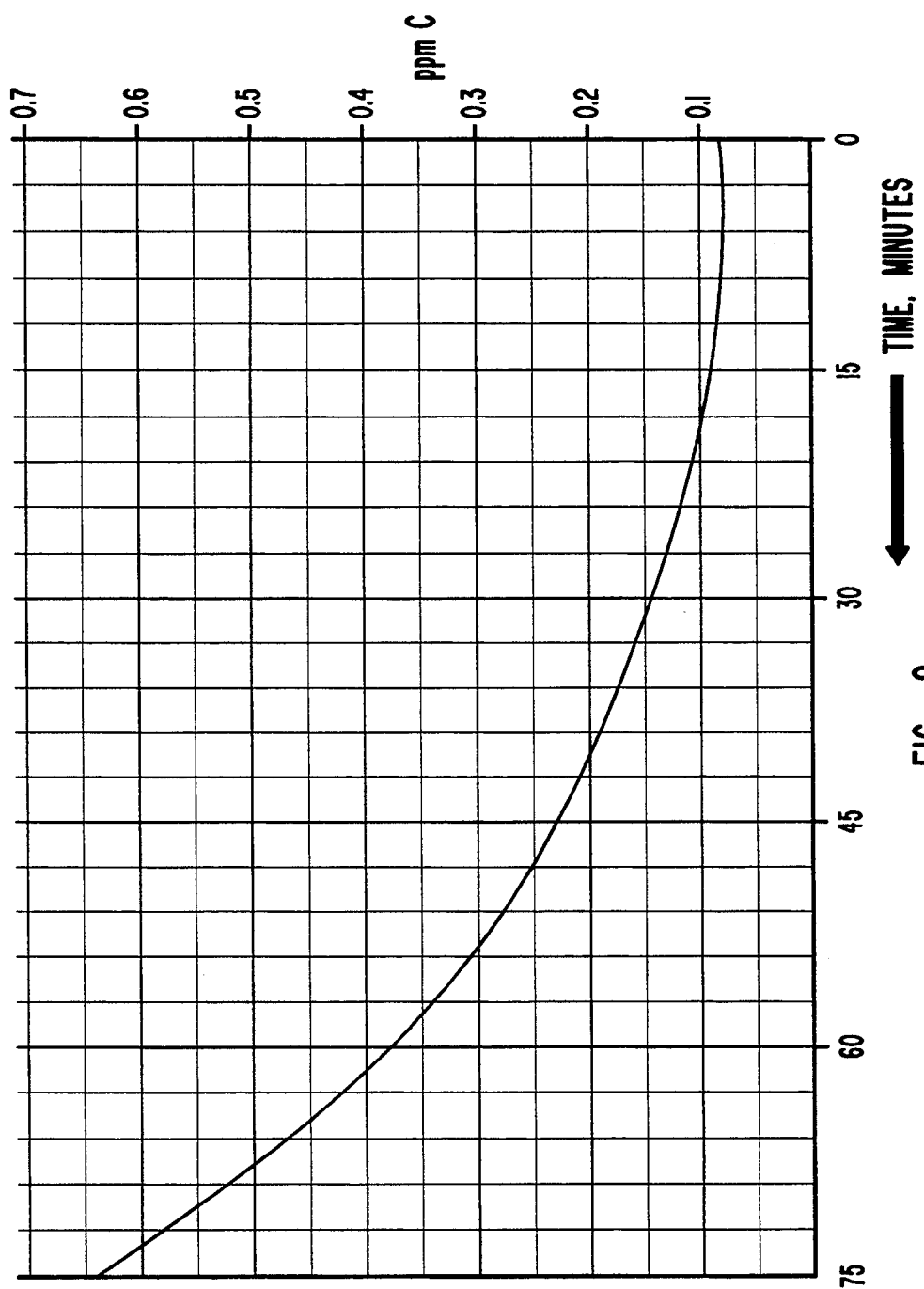
FIG. 2 illustrates results from the oxidation of the compound $C_5H_5N$ by CuO.

An example of these observations is illustrated in the graph of FIG. 2.

Figure 3:
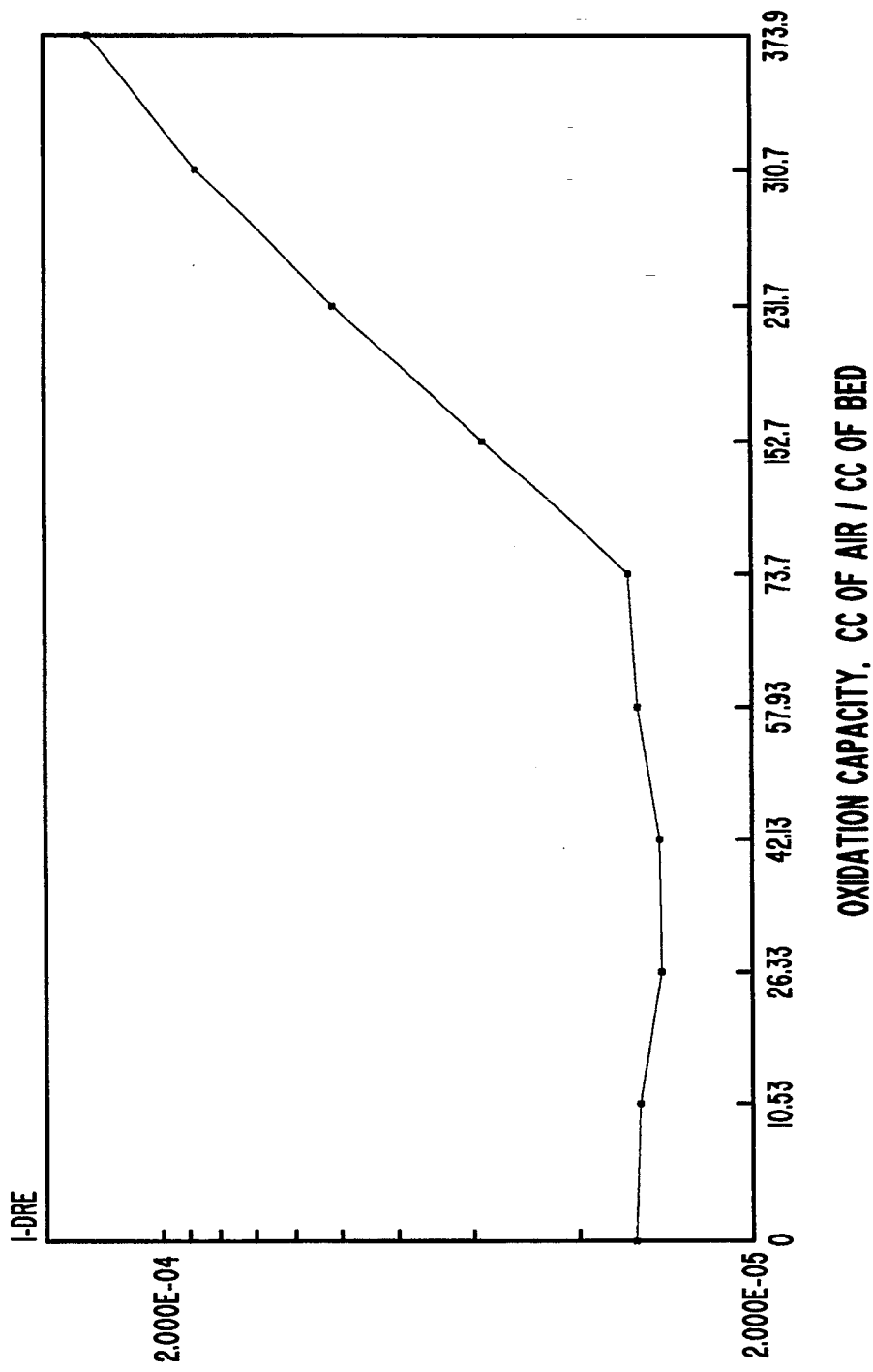
FIG. 3 illustrates results from the destruction and removal efficiency for oxidation of $C_5H_5N$ by CuO.

FIG. 3 illustrates a replot of the data in FIG. 2 in terms of the DRE, and the extent to which the fixed bed's oxidation capacity has been used. As organic matter flows through the fixed bed 30, it is oxidized, and the copper oxide in the bed is reduced. Thus, the amount of copper oxide which is available to oxidize the organic matter decreases. Not surprisingly there is a point at which the amount of organic matter which escapes oxidation starts to increase and the DRE decrease.

In terms of demonstrating the utility of the present invention it is important to note the initial value of the DRE at the start of oxidation and the extent to which the fixed bed's oxidation capacity can be used while maintaining a satisfactorily high DRE. In this context a DRE of 99.9% or even of 99% may be quite satisfactorily high.

Table 1 shows the results of a series of experiments in which the DRE was measured as a function of the extent to which the oxidation capacity was used for a number of organic compounds. For $C_6H_5Cl$, $C_6H_6$, $C_5H_4S$, $C_5H_5N$, and $(HO)_2POCH_2COOH$, very high DREs are achieved initially and the bed's oxidation capacity can be used to high values while maintaining a satisfactorily high DRE. This illustrates that for wide-range organic compounds, i.e., those containing hydrocarbons and those containing oxygen, chlorine, sulfur, nitrogen and phosphorous, the instant invention provides a completely satisfactory method of preventing puffing.

The results for $C_6H_5F$ are not as successful, yet still satisfactory.

With regard to freons, freons have been found to be a special case. Because of their extreme chemical inertness, there is no available technology which can be considered as fully developed for freon disposal. When freons are in the waste feed to an incinerator, even without puffing the DRE is likely to be less than one would wish. The extent of freon destruction which the CuO bed of the present invention provides, however, is in addition to what the rest of the incinerator achieves. Thus, the present invention provides a useful improvement.

Although a fixed bed of 25.5 wt. % CuO was used in the experiment above described, the fixed bed may comprise greater than 10 wt. % CuO supported on alumina.

scope of the present invention. The procedures used in conducting these experiments were similar to those used in Example 1 except for the following exceptions.

First, a fluid bed 50 was housed in a 26 mm ID, 91 cm long, quartz tube which was placed inside an electric furnace 54 with a 30 cm heated length. The fluid bed 50 had a settled height of 13 cm. It operated in a slugging mode with a height of 30 cm. Operation remained within the heated zone.

Gases flowing out of the quartz tube went directly into a laboratory hood 56. Sample gas for the analytical instruments 34, and 36 was obtained by a probe.

TABLE 1

SUMMARY OF FIXED BED EXPERIMENTS

| Run | R, the Organic Oxidized | $[R]i$, input Concentration of the Organic | T, °C. | Time | $O_2$, % | Init. DRE | DRE as a Function of Bed Oxid. Capacity, cc of air/cc of bed | Comments |
|---|---|---|---|---|---|---|---|---|
| 1 | $C_6H_5CL$ | 1,974 ppm C | 802° C. | 0.53 sec. | 3.6 | 99.9985% | 99.99% at 37.3 cc/cc | A |
| 2 | $C_6H_5CL$ | 3,683 ppm C | 812° C. | 0.53 sec. | 3.6 | >99.999% | 99.9% at 136 cc/cc<br>99.% at 207 cc/cc | A |
| 3 | $C_6H_6$ | 10,000 ppm C | 811° C. | 0.53 sec. | 3.6 | 99.997% | 99.9% at 118 cc/cc<br>99% at 197 cc/cc | |
| 4 | $C_5H_4S$ | 19,000 ppm c | 814° C. | 0.53 sec. | 3.6 | >99.9999 | 99.9% at 186 cc/cc<br>99% at 373 cc/cc | |
| 5 | $C_6H_5F$ | 7,800 ppm C | 815° C. | 0.53 sec. | 3.6 | 99.3% | | |
| 6 | $C_6H_5F$ | 7,800 ppm c | 991° C. | 0.45 sec. | 3.6 | 99.94% | 99.9% at 2.8 cc/cc<br>99.3% at 59 cc/cc | |
| 7 | $C_5H_5N$ | 2,520 ppm c | 817° C. | 0.53 sec. | 3.6 | 99.9968% | 99.99% at 99 cc/cc | B |
| 8 | $CCl_3F$ | 6,000 ppm C | 821° C. | 0.53 sec. | 3.6 | 76% | | C |
| 9 | $(HO)_2POCH_2COOH$ | 3,110 ppm C | 818° C. | 0.53 sec. | 3.6 | 99.993% | 99.9% at 29 cc/cc<br>99% at 54 cc/cc | |

COMMENTS
A  Following runs 1 and 2 a flow of nitrogen gas containing 3.02% $O_2$ was passed through the bed while monitoring the $O_2$ content of the gas leaving the bed. It was observed that the oxygen content of the gas coming out of the bed was initially zero and rose to equal the input value only after a delay of 504 seconds. This corresponds to an oxygen consumption of 0.37 moles of $O_2$ per mole of copper in the bed.
B  At the start of this experiment, the DRE increased from 99.9996% to 99.9999% and then began to decrease. Since reducing copper oxide can cause its surface area to increase, this result is not entirely surprising.

EXAMPLE 2

To further demonstrate the control of puffing, the experimental setup in FIG. 1 was modified to allow the sudden injection of one cc of home heating oil (referred to as a slug of heating oil) onto the top of the bed of supported copper oxide (fixed bed 30) at 818° C. while an oxygen/nitrogen mixture (3.6% $O_2$) flowed downward through the fixed bed.

As the boiling ranges of home heating oils are much below 818° C., this sudden injection caused the oil to be rapidly vaporized. The flow rate of the oxygen/nitrogen mixture was sufficient to sweep the oil vapors through the fixed bed 30 with a residence time of 0.53 seconds. The amount of oxygen in the gas coming out of the fixed bed 30 was measured continuously.

Figure 4:
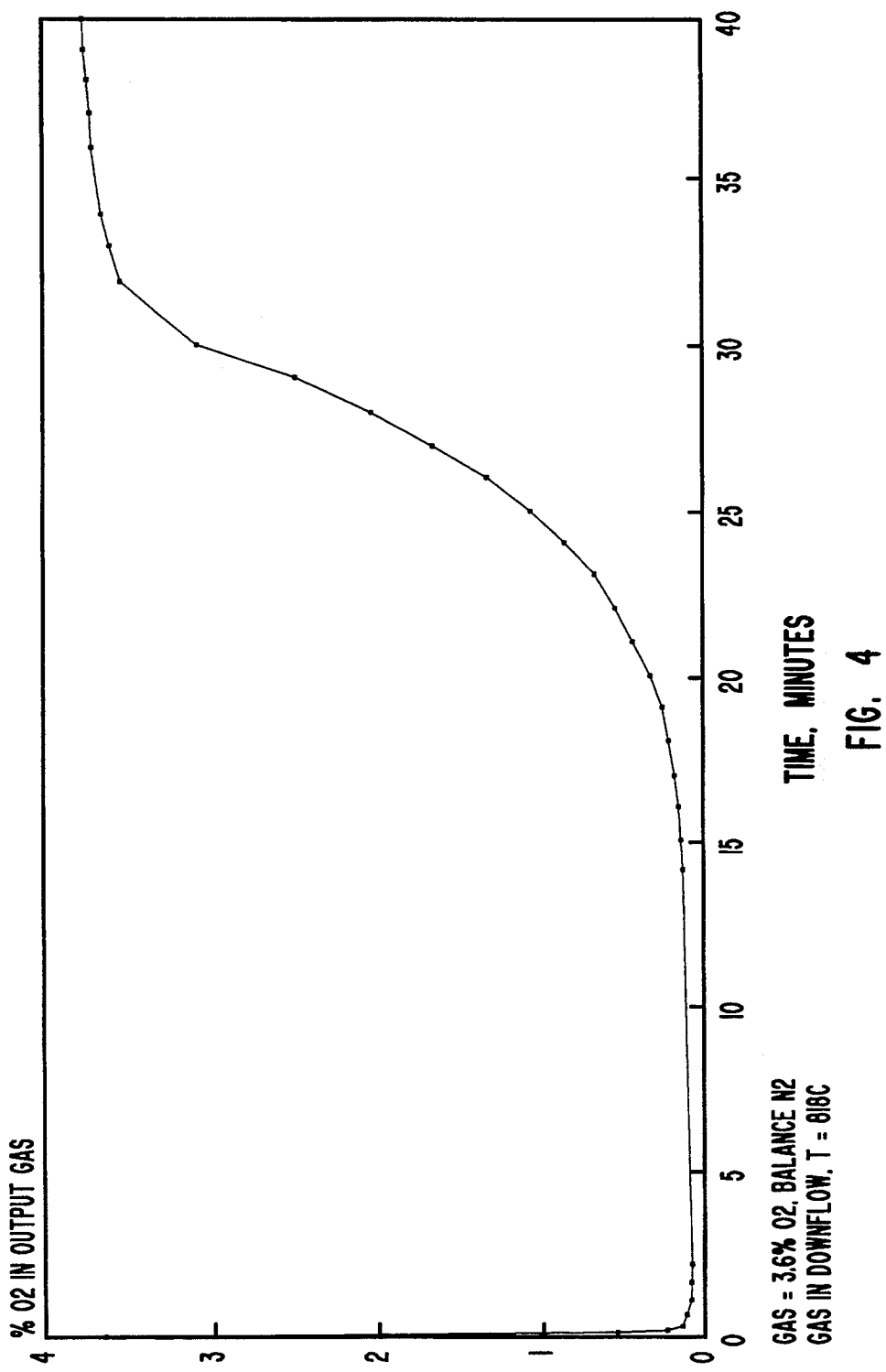
FIG. 4 illustrates results from the injection of 1 cc of home heating oil into a bed of supported CuO.

As shown in FIG. 4, the injection of the slug of heating oil decreased the oxygen content of the gas exiting the bed for an extended period of time. When the heating oil went through the fixed bed 30, the heating oil was oxidized and the copper oxide reduced to copper. When the sudden slug of heating oil was oxidized, the rate at which air was supplied was again more than sufficient for complete oxidation and the reduced metal oxide was oxidized back to its original state.

This example illustrates that the instant invention is effective against puffs of high intensity and brief duration.

EXAMPLE 3

Figure 5:
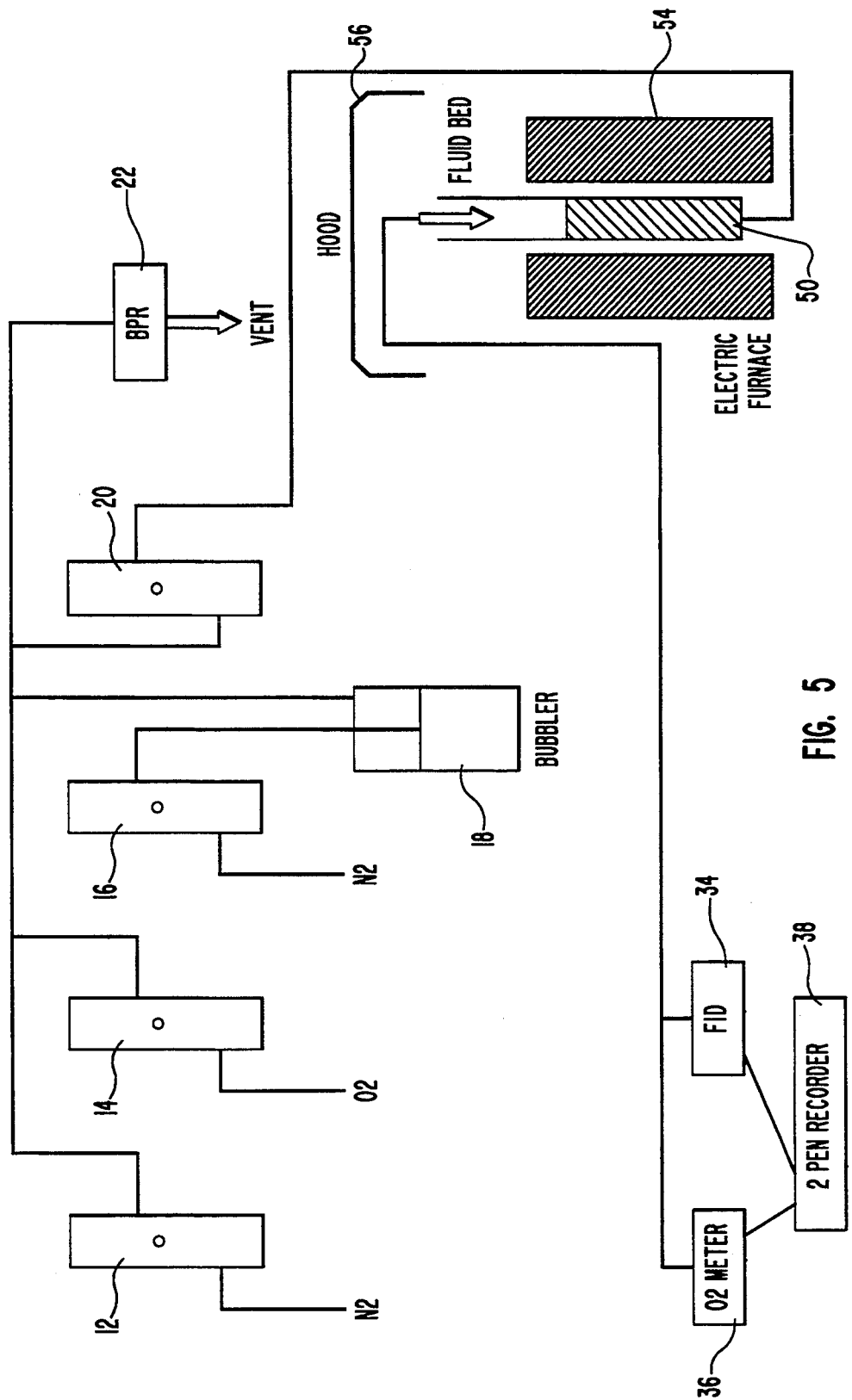
FIG. 5 illustrates an experimental setup using a fluid bed of reducible metal oxide to oxidize organic compounds.

The apparatus shown in FIG. 5 demonstrates, on a laboratory scale, a fluid bed embodiment within the scope of the present invention.

The material in the fluid bed 50 was 16.8 wt % CuO supported on Alcoa type F-1 activated alumina, 28–48 mesh.

Table 2 lists the experimental conditions used in these fluid bed experiments and Table 3 shows the initial DREs which were achieved and the extent to which the bed's oxidation capacity could be used while maintaining the DRE above some predetermined value. Again, the results illustrate that the instant invention provides a highly effective method of preventing puffing both in terms of the initial DRE the puff receives and the size of the puff for which a high DRE can be maintained.

TABLE 2

| Run | R, the Organic being Oxidized | $[R]i$, input Concentration of the organic | T, °C. | Time |
|---|---|---|---|---|
| 10 | $C_6H_6$ | 8,000 ppm C | 806° C. | 0.75 sec. (Fluid) |
| 11 | $C_6H_5Cl$ | 3,900 ppm C | 805° C. | 0.75 sec. (Fluid) |

TABLE 3

| Run | R, the Organic being Oxidized | Initial DRE | DRE as a function of Bed Oxidation Capacity, cc of air/cc of bed |
|---|---|---|---|
| 10 | $C_6H_6$ | >99.994% | 99.9% at CF = 43 |
| 11 | $C_6H_5Cl$ | >99.95 | 99.9% at CF = 169<br>99.% at CF = 215 |

The bed which was used in the examples was a bed of a copper oxide. Iron oxide may also be used.

The reducible metal oxide may be used at the bulk metal with its surface oxidized, as the bulk oxide, or on a porous support. Among porous supports, alumina is preferred.

Although a fluid bed of 16.8 wt. % CuO was used in the experiment above described, the fluid bed may comprise greater than 10 wt. % CuO supported on alumina.

EXAMPLE 4

Figure 6:
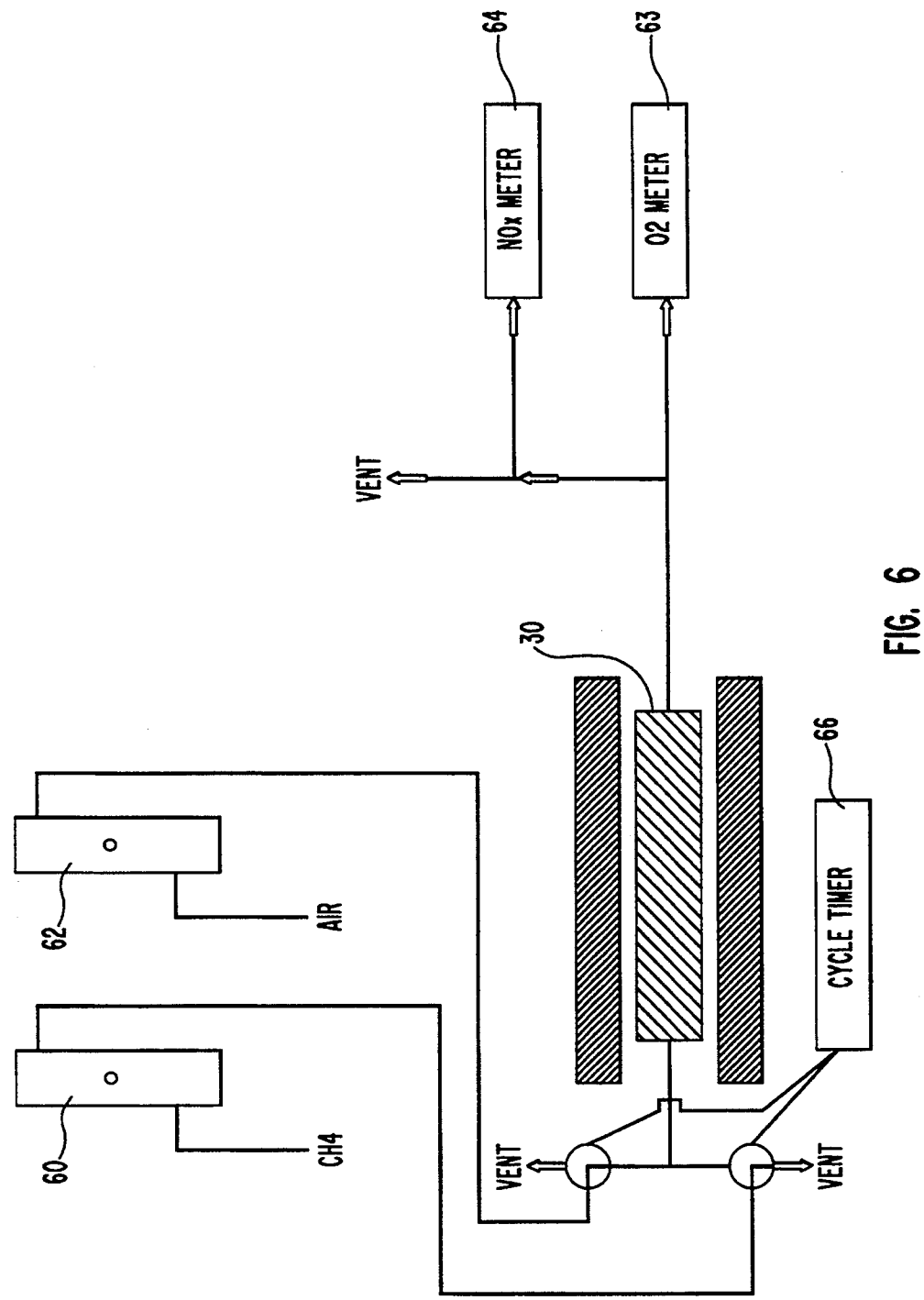
FIG. 6 illustrates an experimental setup for demonstrating that the CuO bed can be used repeatedly.

In order to demonstrate that the oxidizing means could be used to prevent a large number of puffs, an experiment was done with the setup shown in FIG. 6.

As can be seen, a flow of methane was measured by a rotameter 60 and a flow of air was measured by a rotameter 62. The two flows were sent to the common inlets of two electrically activated three way valves. The use of three way valves allowed the flow through the rotameters to be continuous and hence more accurately measurable.

One of the flows was passed through the three way valve to vent while the other was passed through a 0.902 ID steel tube in an electrical furnace, the heated length of this tube having a volume of 160 cc and containing 87 grams of 25.5% copper oxide on alumina rings. An electrical cycle timer 66 was used to switch the three way valves at predetermined intervals.

Typically, the methane would pass through the bed for one second, then the air for 15 seconds, then the methane for one second, and so on.

In this experiment it was observed that a bed of CuO was subjected to more than 5,400 puffs of pure methane and showed no signs of mechanical deterioration or of its losing chemical activity.

EXAMPLE 5

Experiments were done using the setup shown in FIG. 6 as an unmixed combustor, i.e., a combustor through which a fuel (methane) and air are alternately passed with little or no opportunity to mix. It was found that whereas in conventional combustion the stoichiometric ratio (i.e. the air to fuel ratio) is a critical parameter, in unmixed combustion the overall stoichiometric ratio is divided into two stoichiometric ratios, each of which is important. The first of these is the ratio of amount of fuel passed through the bed during a cycle to the capacity of the bed to oxide fuel. The second is the ratio of the amount of air passed through the bed to the capacity of the bed to reduce air.

Figure 7:
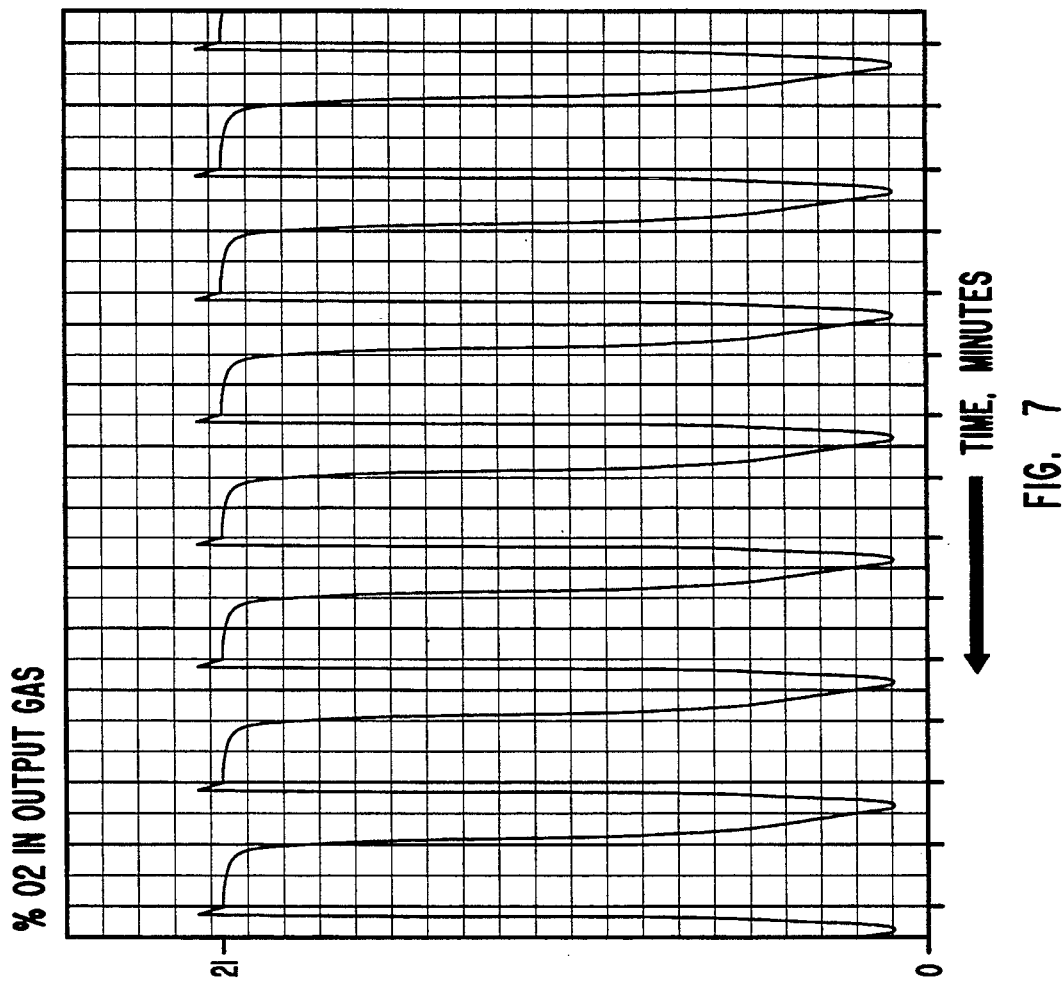
FIGS. 7 and 8, respectively, illustrate the effect of relatively long and short cycle time during unmixed combustion.

FIG. 7 illustrates the results of an experiment in which conditions were adjusted so that the fuel to bed stoichiometric ratio is less than 1 but the air to bed stoichiometric ratio was greater than 1. During the part of the cycle in which air flows through the bed, the oxygen content of the gas coming out of the bed was found to be initially low, but later in the cycle was found to rise to that of the air going into the bed.

Figure 8:
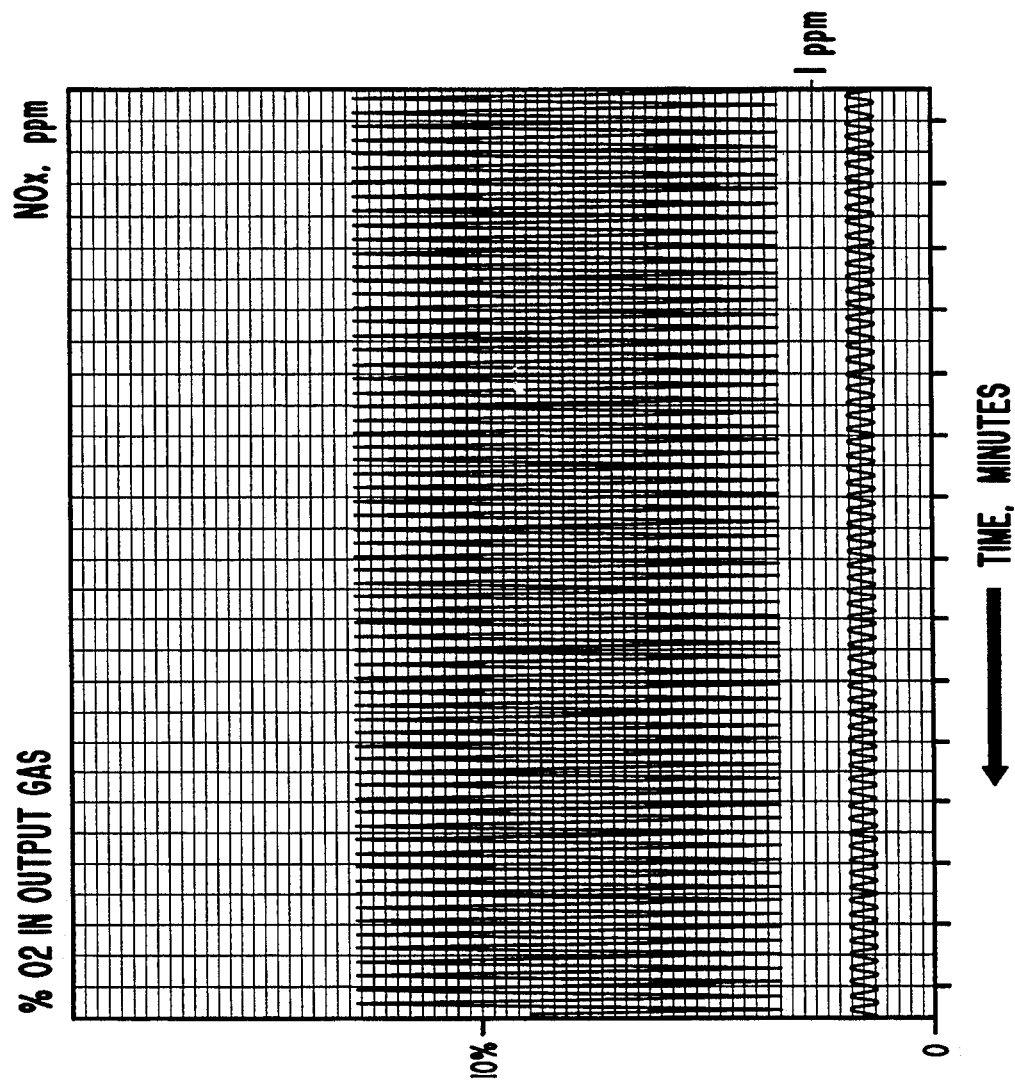

FIG. 8 illustrates that effect of shortening the cycle time and thereby decreasing the air to bed stoichiometric ratio so that it also is less than 1.0. Operating in this manner prevents extreme variation in the oxygen content of the post combustion gases but does not completely remove the cyclic variation in $O_2$ content. FIG. 8 also illustrates the measure of $NO_x$ content of the post-combustion gases.

Figure 9:
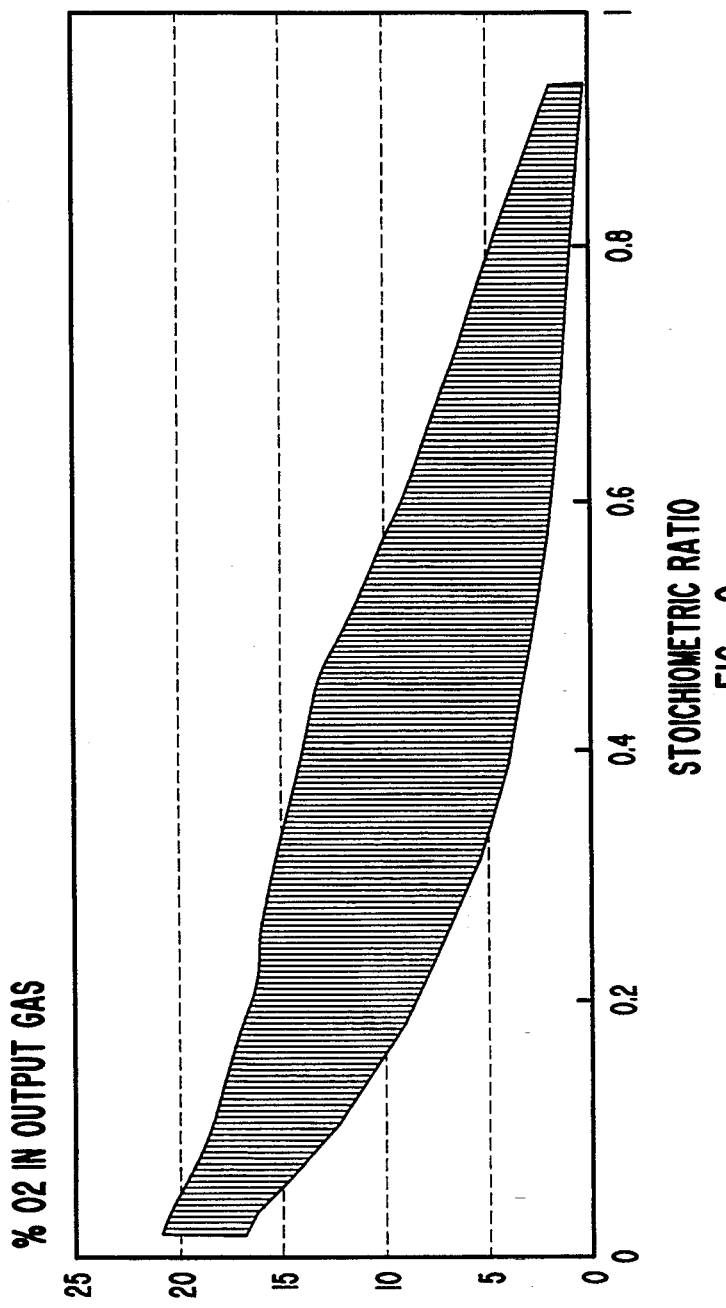
FIGS. 9 and 10 illustrate the effect of varying the overall fuel to air stoichiometric ratio on the cyclic variation of the $O_2$ content of the post combustion gases and the cyclic variation of the $NO_x$ content.
Figure 10:
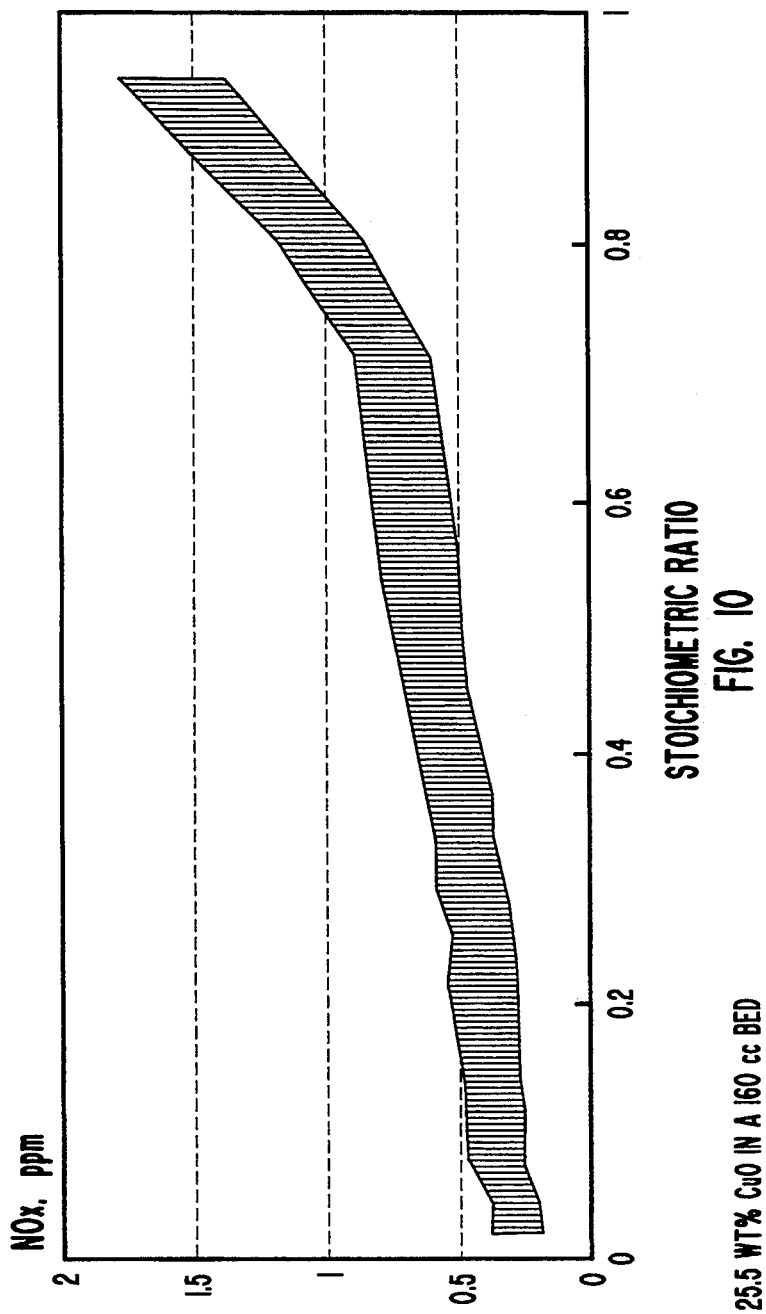

FIGS. 9 and 10 illustrate the effect of varying the overall fuel to air stoichiometric ratio on the cyclic variation of the $O_2$ content of the post-combustion gases and the cyclic variation of the $NO_x$.

Figure 11:
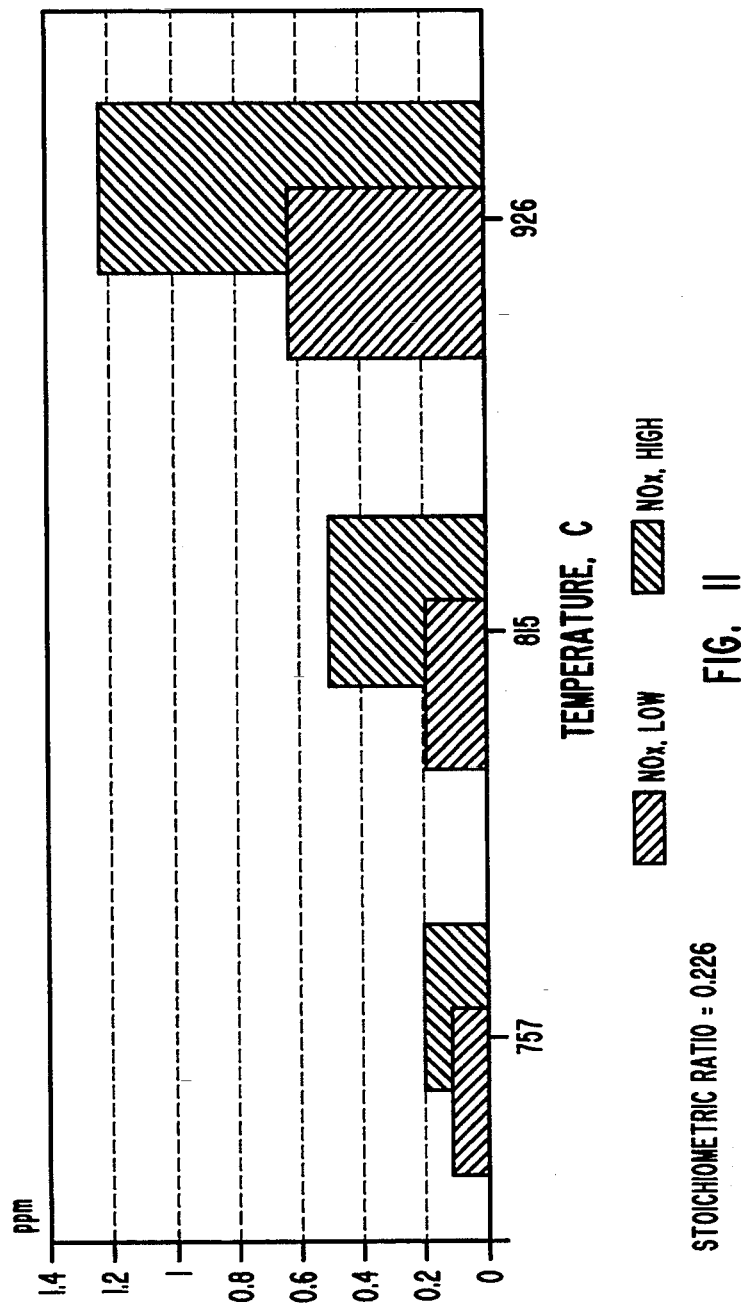
FIG. 11 illustrates the effect of temperature on $NO_x$ production during unmixed combustion.

Experiments were also conducted in which the amount of $NO_x$ produced during unmixed combustion was measured at different temperatures. The results are illustrated in FIG. 11.

In another experiment the electrical furnace was shut off and the combustor was allowed to operate autothermally with a $CH_4$ input of 3,212 cc/min for 2 seconds, off for 15 seconds, and an air input of 3,000 cc/min for 15 seconds, off for 2 seconds. Initially the bed temperature in this experiment was 775° C. After dropping to 635° C. the bed temperature wandered, slowly rising to 681° C. At 2.8 hours after shutting off the electric furnace the run was voluntarily terminated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A method of oxidizing fuel in a combustion device in which the rate at which the fuel is fed is irregular, causing the ratio of fuel to air to fluctuate in space or time, the fluctuations on some occasions being large enough so that portions of a fuel and air mixture do not contain enough air for complete combustion, the method comprising the steps of:
   a) providing within the combustion device an oxidizing means for supplying a readily reducible metal oxide, the reduced form of the metal oxide being readily oxidized, the metal oxide provided in an amount sufficient to maintain a reservoir of oxygen for complete oxidation of the fuel; and
   b) passing the fuel and air mixture, at an elevated temperature, through said oxidizing means such that any portion of the fuel and air mixture which does not contain sufficient air for complete oxidation of the fuel can react with said oxidizing means, and thereby be completely oxidized.

2. A method for oxidizing fuel as defined in claim 1, wherein the readily reducible metal oxide comprises copper oxide.

3. A method for oxidizing fuel as defined in claim 1, wherein the readily reducible metal oxide comprises iron oxide.

4. A method for oxidizing fuel as defined in claim 1, wherein the oxidizing means for supplying a readily reducible metal oxide comprises a fixed bed of individual particles.

5. A method for oxidizing fuel as defined in claim 1, wherein the oxidizing means for supplying a readily reducible metal oxide comprises a fluid bed of individual particles.

6. A method for oxidizing fuel as defined in claim 1, wherein the oxidizing means for supplying a readily reducible metal oxide comprises a substantially honeycomb shaped formation of porous ceramic impregnated with a reducible metal oxide, said honeycomb shaped formation having channels formed through which the fuel and air mixture passes.

7. A method for oxidizing fuel as defined in claim 1, wherein the elevated temperature in the step of passing the fuel and air mixture, at an elevated temperature, through said oxidizing means for supplying a readily reducible metal oxide comprises a temperature greater than 600 degrees C.

8. A method for oxidizing fuel as defined in claim 1, wherein the elevated temperature in the step of passing the fuel and air mixture, at an elevated temperature, through said oxidizing means for supplying a readily reducible metal oxide comprises a temperature within the range of from about 700 degrees C. and about 1,200 degrees C.

9. A method for oxidizing fuel as defined in claim 1, wherein the elevated temperature in the step of passing the fuel and air mixture, at an elevated temperature, through said oxidizing means for supplying a readily reducible metal oxide comprises a temperature within the range of from about 750 degrees C. and about 1,050 degrees C.

10. A method for oxidizing fuel as defined in claim 1, wherein the fuel and air mixture are passed through the oxidizing means for supplying a reducible metal oxide at a residence time of at least 0.01 seconds.

11. A method for oxidizing fuel as defined in claim 1, wherein the fuel and air mixture are passed through the oxidizing means for supplying a reducible metal oxide at a residence time of at least 0.1 seconds.

12. A method for oxidizing fuel as defined in claim 1, wherein the fuel and air mixture are passed through the oxidizing means for supplying a reducible metal oxide at a residence time within the range of from about 0.1 seconds and about 2.0 seconds.

13. A method for oxidizing fuel as defined in claim 1, wherein the reduced metal oxide is used as a bulk metal with its surface oxidized.

14. A method for oxidizing fuel as defined in claim 1, wherein the reduced metal oxide is used as a bulk oxide.

15. A method for oxidizing fuel as defined in claim 1, wherein the reduced metal oxide is used on a porous support.

16. A method for oxidizing fuel as defined in claim 15, wherein the porous support is alumina.

17. A method for oxidizing fuel as defined in claim 4, wherein the fixed bed comprises greater than 10 weight % CuO supported on alumina.

18. A method for oxidizing fuel as defined in claim 5, wherein the fluid bed comprises greater than 10 weight % CuO supported on activated alumina.

19. A method for oxidizing fuel as defined in claim 1, wherein the step of passing the fuel and air mixture, at an elevated temperature, through said oxidizing means for supplying a readily reducible metal oxide transpires within the region of greatest heat release within the combustion device.

20. A method for oxidizing fuel as defined in claim 1, wherein the step of passing the fuel and air mixture, at an elevated temperature, through said oxidizing means for supplying a readily reducible metal oxide transpires downstream of the region of greatest heat release within the combustion device.

21. A method for oxidizing fuel as defined in claim 1, wherein the combustion device comprises a rotary kiln incinerator.

22. A method for controlling puffing in a rotary kiln incinerator in which organic matter may be incinerated such that the rate at which the organic matter is fed is irregular, causing the ratio of organic matter to air to fluctuate in space or time, the fluctuations on some occasion being large enough so that portions of an organic matter and air mixture do not contain enough air for complete combustion, the method comprising the steps of:
 a) providing within the rotary kiln incinerator an oxidizing means for supplying a readily reducible metal oxide, the metal oxide provided in an amount sufficient to maintain a reservoir of oxygen for oxidizing any organic matter passing through said oxidizing means, said oxidizing means being positioned downstream to the rotary kiln; and
 b) passing the organic matter and air mixture, at an elevated temperature, through said oxidizing means such that any unoxidized organic portion of the organic matter and air mixture which does not contain sufficient air for complete oxidation of the organic matter can react with said oxidizing means, thereby completely oxidizing the organic matter.

23. A method for controlling puffing as defined in claim 22, wherein the readily reducible metal oxide is copper oxide.

24. A method for oxidizing fuel as defined in claim 22, wherein the oxidizing means for supplying a readily reducible metal oxide comprises a fixed bed of individual particles.

25. A method for oxidizing fuel as defined in claim 22, wherein the oxidizing means for supplying a readily reducible metal oxide comprises a fluid bed of individual particles.

26. A method for oxidizing fuel as defined in claim 22, wherein the oxidizing means for supplying a readily reducible metal oxide comprises a substantially honeycomb shaped formation of porous alumina impregnated with a reducible metal oxide, said honeycomb shaped formation having channels formed therein through which the fuel and air mixture passes.

27. A method for oxidizing fuel as defined in claim 22, wherein the elevated temperature in the step of passing the fuel and air mixture, at an elevated temperature, through said oxidizing means for supplying a readily reducible metal oxide comprises a temperature within the range of from about 750 degrees C. and about 1,050 degrees C.

28. An improved combustion system comprising:
 a) a combustion device in which a mixture of fuel and air is nonuniform in space or fluctuates in time, some portions of this mixture not containing sufficient air for complete oxidation of the fuel; and
 b) oxidizing means for supplying a reducible metal oxide, the metal oxide provided in an amount sufficient to maintain a reservoir of oxygen for oxidizing the fuel, said oxidizing means for supplying a reducible metal oxide positioned within said combustion device such that the mixture of fuel and air may be passed at an elevated temperature therethrough, so as to completely oxidize any unoxidized fuel passing therethrough.

29. An improved combustion system as defined in claim 28, wherein the oxidizing means for supplying a readily reducible metal oxide comprises a fixed bed of individual particles.

30. An improved combustion system as defined in claim 28, wherein the oxidizing means for supplying a readily reducible metal oxide comprises a fluid bed of individual particles.

31. An improved combustion system as defined in claim 28, wherein the oxidizing means for supplying a readily reducible metal oxide comprises a substantially honeycomb shaped formation of porous alumina impregnated with a reducible metal oxide, said honeycomb shaped formation having channels forced through which the fuel and air mixture passes.

32. An improved combustion system as defined in claim 28, wherein the readily reducible metal oxide comprises copper oxide.

33. An improved combustion system as defined in claim 28, wherein the readily reducible metal oxide comprises iron oxide.

34. An improved combustion system as defined in claim 29, wherein the fixed bed comprises more than 10 weight % CuO supported on alumina.

35. An improved combustion system as defined in claim 30, wherein the fluid bed comprises more than 10 weight % CuO supported on alumina.

36. An improved combustion system as defined in claim 28, wherein the combustion device is a rotary kiln incinerator.

37. A combustion system in which $NO_x$ production is controlled comprising:
   a) a combustion device in which fuel and air are largely unmixed during combustion, such that direct contact between the fuel and air, which favors the production of $NO_x$, is substantially eliminated and extremely high temperatures, which also favor the production of $NO_x$, are avoided;
   b) oxidizing means for supplying a reducible metal oxide so as to provide a reservoir of oxygen to oxidize the fuel; and
   c) means for contacting a reduced metal oxide with air so as to reoxidize the reduced metal oxide and renew the reservoir of oxygen.

38. A combustion system in which $CO_2$ production is controlled comprising:
   a) a combustion device in which the fuel and air are largely unmixed during combustion, such that direct contact between the fuel and air is substantially eliminated and extremely high temperatures are avoided;
   b) a bed of a readily reducible metal oxide whereby the fuel can be oxidized without contacting the air; and
   c) means whereby post combustion mixing of the oxidized fuel and the oxygen depleted air may be avoided.

39. A combustion system according to claim 37, wherein the fuel and air are passed alternately through a bed of the reducible metal oxide, the amount of fuel being passed during each cycle being less than that which would be required to completely reduce the metal oxide to metal, and the amount of air which is passed during each cycle being more than sufficient for complete oxidation of the fuel.

40. A combustion system according to claim 37, wherein the fuel and air are passed through different regions of the combustion system and a readily reducible metal oxide/readily oxidized metal moves between these regions, the amount of air going through one region being more than sufficient to fully oxidize the amount of fuel being passed through the other region, and the rate of circulation of the readily reducible metal oxide/readily oxidized metal between the regions being sufficient to keep at least some metal oxide in the fuel region at all times.

41. A combustion system according to claim 37, wherein the fuel and air are alternately contacted with the reducible metal oxide, the amount of fuel being contacted during each cycle being less than that which would be required to completely reduce the metal oxide to metal, and the amount of air which is contacted during each cycle being more than sufficient for complete oxidation of the fuel.

* * * * *

UNITED STATES PATENT AND TRADEMARK OFFICE
CERTIFICATE OF CORRECTION

PATENT NO. : 5,339,754
DATED : August 23, 1994
INVENTOR(S) : RICHARD K. LYON

It is certified that error appears in the above-indentified patent and that said Letters Patent is hereby corrected as shown below:

Column 3, line 15, "devices" should be --device's--
Column 3, line 32, "principle object" should be --principal object--
Column 5, line 46, "a" should be --an--
Column 8, line 11, "1,038" should be --1.038--
Column 8, line 61, "phosphorous" should be --phosphorus--
Columns 9 and 10, at end of Table 1, after Comment B, the following should be added: --C In this experiment, the DRE was also 76% when the gas flowing through the reactor contained 4.1% $O_2$. Thus, the limited amount of oxidation which occurred was due solely to the copper oxide.--

Signed and Sealed this

Fourth Day of November, 1997

Attest:

BRUCE LEHMAN

*Attesting Officer*  *Commissioner of Patents and Trademarks*